(12) United States Patent
Dean et al.

(10) Patent No.: US 6,286,184 B1
(45) Date of Patent: Sep. 11, 2001

(54) CASTOR WITH BRAKE AND LOCKING MECHANISM

(75) Inventors: Joseph D. Dean, Greenwood; Mark A. Starnes, Fillmore, both of IN (US)

(73) Assignee: Perry Manufacturing, Inc., Indianapolis, IN (US)

( * ) Notice: Subject to any disclaimer, the term of this patent is extended or adjusted under 35 U.S.C. 154(b) by 0 days.

(21) Appl. No.: 09/364,135

(22) Filed: Jul. 30, 1999

(51) Int. Cl.[7] .................................................. B60B 33/00
(52) U.S. Cl. ........................................ 16/35 R; 16/18 R
(58) Field of Search ........................ 161/35 R; 188/1.12, 188/29

(56) References Cited

U.S. PATENT DOCUMENTS

| | | |
|---|---|---|
| 1,733,536 | 10/1929 | Guitschula . |
| 1,778,167 | 10/1930 | Roe . |
| 2,227,832 | 1/1941 | Herold . |
| 2,434,863 | 1/1948 | Parkhill . |
| 2,512,941 * | 6/1950 | Johnson ............... 16/35 R |
| 3,239,873 * | 3/1966 | Fisher ................... 16/35 R |
| 3,985,208 | 10/1976 | Libhart .................. 188/1 |
| 4,336,630 | 6/1982 | Page ...................... 16/35 |
| 5,012,550 | 5/1991 | Schlosser ............... 16/35 |
| 5,509,506 * | 4/1996 | Jones .................... 16/35 R |
| 5,829,096 * | 11/1998 | Perry .................... 16/35 R |

FOREIGN PATENT DOCUMENTS

| | | | |
|---|---|---|---|
| 33 46 722-C1 * | 6/1985 | (DE) ................... | 16/35 R |
| 3346722 C1 * | 6/1985 | (DE) . | |
| 41 28 729-A1 * | 3/1993 | (DE) ................... | 16/35 R |
| 4128729 A1 * | 3/1993 | (DE) . | |
| 1102262 | 2/1968 | (GB) ................... | A47B/89/00 |
| 2155321 A * | 9/1985 | (GB) . | |
| 2155321A | 9/1985 | (GB) ................... | B60B/33/00 |
| 2 187 946-A * | 9/1987 | (GB) ................... | 16/35 R |
| 2187946 A * | 9/1987 | (GB) . | |

* cited by examiner

*Primary Examiner*—Anthony Knight
*Assistant Examiner*—Ruth C. Rodriquez
(74) *Attorney, Agent, or Firm*—Woodard, Emhardt, Naughton Moriarty & McNett

(57) ABSTRACT

A caster is provided with two braking mechanisms and/or a locking mechanism. One embodiment of the present invention provides a castor including a wheel having an axis of rotation and a mounting bracket for a load. A brake lever is attached to the wheel adjacent the axis of rotation and pivotally attached to the mounting bracket. The brake lever is movable to selectively place the wheel and mounting bracket in a locked position or a rotation position. A first brake surface is associated with the mounting bracket and contacts the wheel when the wheel is in the locked position to substantially restrict wheel rotation. A second brake member, having a second brake surface, is linked to the mounting bracket and the brake lever so that the second brake surface contacts the wheel when the wheel is in the locked position. In an alternate embodiment, a lock mechanism is associated with the castor and is selectively engagable to restrict the wheel from moving from the locked position to the rotation position. A preferred embodiment includes a second brake member and a lock mechanism.

19 Claims, 6 Drawing Sheets

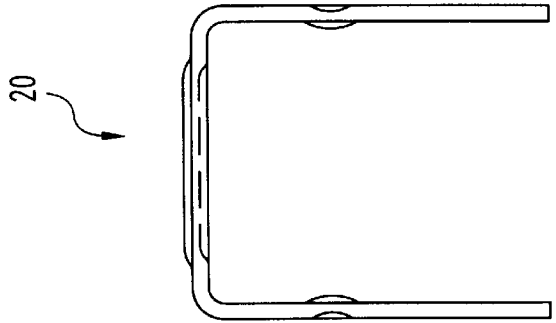
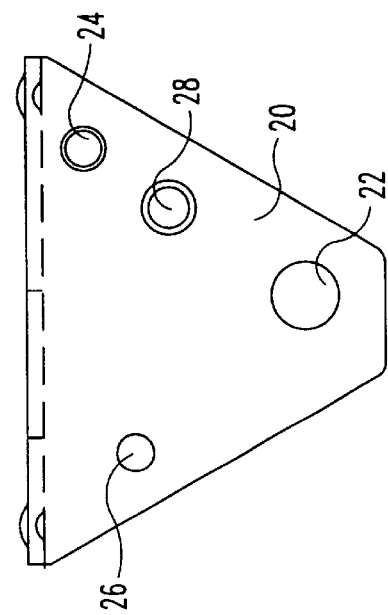
*Fig. 6A*
*Fig. 6B*
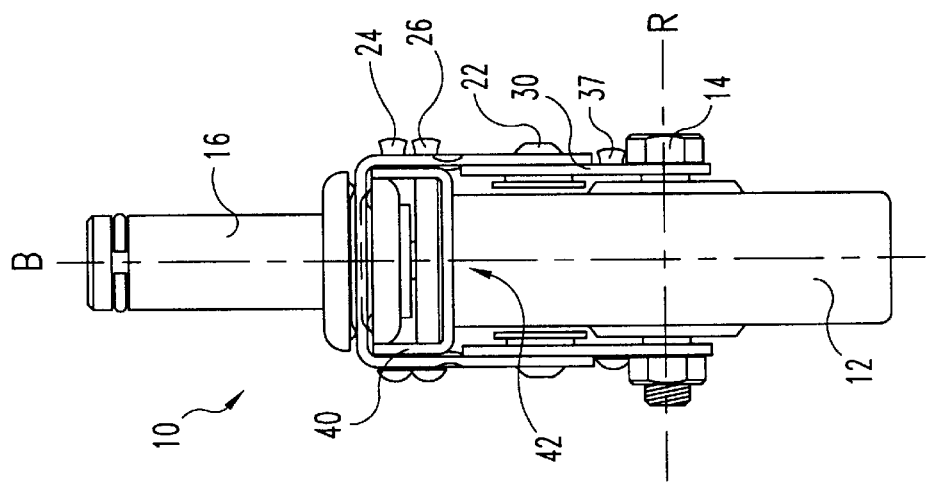
*Fig. 5*

CASTOR WITH BRAKE AND LOCKING MECHANISM

FIELD OF THE INVENTION

The present invention relates to a castor for scaffolding, equipment, or other loads. More particularly, the present invention relates to locking and braking mechanisms for a castor.

BACKGROUND OF THE INVENTION

Frequently, it is desirable to have equipment or heavy loads mounted on castors or wheels for mobility while maintaining the ability to fix the load in place. Construction scaffolding is an example of such a use where assembly and use of the scaffolding may first occur in one location, but thereafter it is desired to move the scaffolding to a new location without spending the time or effort necessary to disassemble and reassemble it. Traditionally, there have been safety concerns regarding scaffolding or loads on wheels since such constructs are prone to wobble and/or movement if not braced or anchored. To counteract this it is desirable to stop or substantially restrict rotation of the wheels to provide the necessary stability.

One attempt to address this problem is discussed in U.S. Pat. No. 5,829,096 issued to Eugene Perry. The Perry patent illustrates a typical prior art castor consisting of a wheel, a load bracket, a foot lever, and one brake. In a typical prior art castor, the operator steps on the foot lever to transpose the load over the center of the wheel. This movement brings the wheel into contact with the brake, where resistance and inertia may restrict movement of the wheel.

There remains a need for a castor which can safely and selectively restrict movement of the wheel to provide improved load stability.

SUMMARY OF THE INVENTION

A caster is provided with two braking mechanisms, a locking mechanism or a combination thereof. One embodiment of the present invention provides a castor including a wheel having an axis of rotation and a mounting bracket for a load. A brake lever is attached to the wheel adjacent the axis of rotation and pivotally attached to the mounting bracket. The brake lever is movable to selectively place the wheel and mounting bracket in a locked position or a rotation position. A first brake surface is associated with the mounting bracket and contacts the wheel when the wheel is in the locked position to substantially restrict wheel rotation. In one embodiment, a second brake member, having a second brake surface, is linked to the mounting bracket and the brake lever so that the second brake surface contacts the wheel when the wheel is in the locked position. In an alternate embodiment, a lock mechanism is associated with the castor and is selectively engagable to restrict the wheel from moving from the locked position to the rotation position. A preferred embodiment includes a second brake member and a lock mechanism.

It is one object of the present invention to provide an improved castor.

Further objects, features and advantages of the present invention shall become apparent from the detailed drawings and descriptions provided herein.

BRIEF DESCRIPTION OF THE DRAWINGS

FIG. 5 is a left, end-on view of the castor of FIG. 2.

FIG. 6A and 6B are side and front views of the mounting bracket used in the castor of FIG. 1.

DESCRIPTION OF PREFERRED EMBODIMENTS

For the purposes of promoting an understanding of the principles of the present invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

The present invention provides a castor for use with equipment or other heavy loads such as scaffolding. When in a locked position, the present invention increases stability of the load by restricting movement of the wheel. In some embodiments, movement is restricted by providing additional braking surface engaging the wheel. Alternate embodiments of the present invention provide a lock to prevent unintended movement of the wheel from a locked position to a rotation position.

Figure 1:
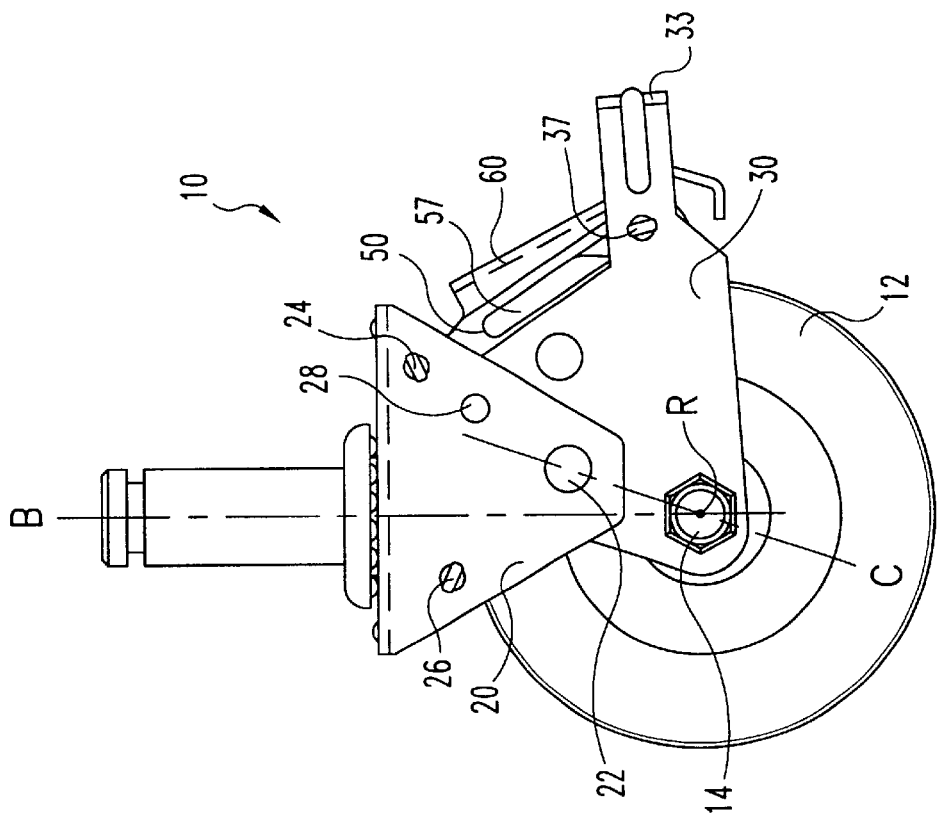
FIG. 1 is a side view of one preferred embodiment of the present invention in an unlocked position.
Figure 2:
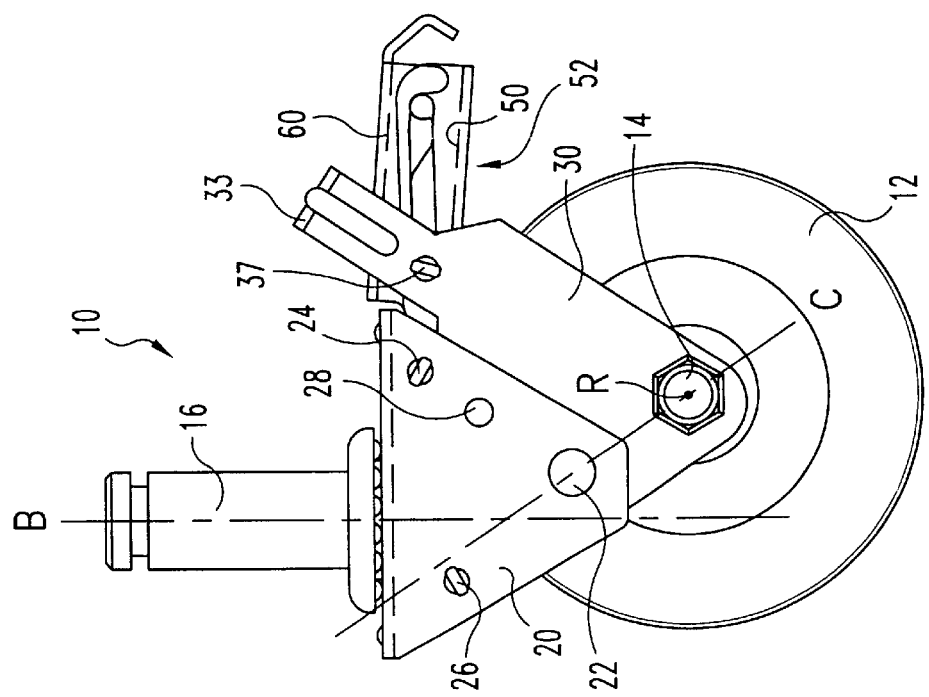
FIG. 2 is a side view of the castor of FIG. 1 in a locked position.

One preferred embodiment of the present invention is illustrated with castor 10 in an unlocked position in FIG. 1 and in a locked position in FIG. 2. Castor 10 includes wheel 12, mounting bracket 20, and brake lever 30. Wheel 12 has axis of rotation R where it is rotatably mounted to brake lever 30 by axle bolt 14. Brake lever 30 is pivotally connected to mounting bracket 20 at pivot-points 22 with rivets or other connectors on either side of castor 10. Load bearing means 16 such as a stem, pole or other attachment is oriented on mounting bracket 20 and defines load bearing axis B through load bearing means 16 and mounting bracket 20. Load bearing means 16 may optionally be free to rotate on bracket 20. Castor axis C extends in a line which intersects axis of rotation R and a line extending through pivot points 22. Axis C pivots about pivot points 22 as castor 10 and wheel 12 are moved between a locked and an unlocked or rotation position.

Figure 4:
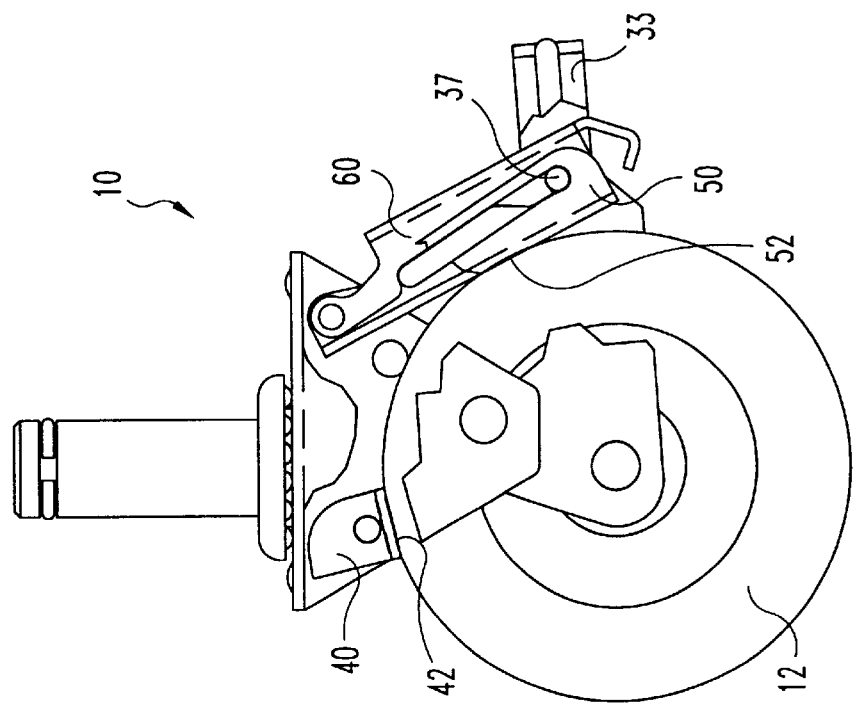
FIG. 4 is a partially cut-away side view of the castor illustrated in FIG. 2 in a locked position.

Mounting pin 26 extends through opposing openings in mounting bracket 20 and couples first brake member 40 (FIG. 5) to mounting bracket 20. Mounting pin 24 extends through opposing openings in mounting bracket 20 and pivotally couples second brake member 50 and locking member 60 to mounting bracket 20. Second brake member 50 extends from bracket 20 linking mounting bracket 20 and brake lever 30 via sliding pin 37. Pin 37 is mounted to brake lever 30 and extends through slots 57 in second brake member 50. Second brake member 50 includes second braking surface 52 (FIG. 4). Brake lever 30 includes foot pedal 33.

Figure 3:
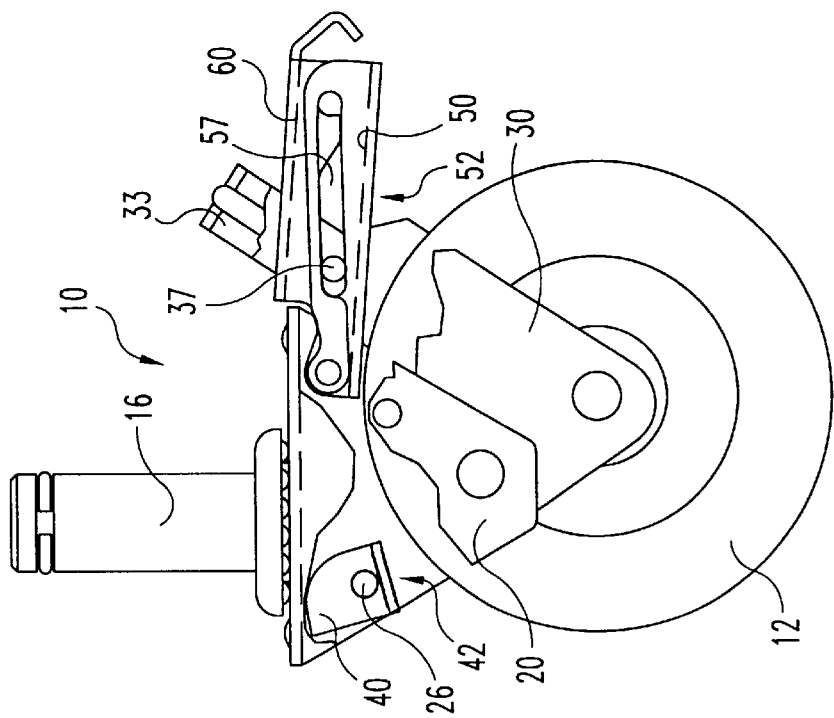
FIG. 3 is a partially cut-away side view of the castor illustrated in FIG. 1 in an unlocked position.

FIGS. 3 and 4 illustrate partially cut away views of castor 10 in unlocked and locked positions respectively. A left front, wheel-on view of castor 10 is illustrated in FIG. 5. First braking member 40 includes first braking surface 42, and second braking member 50 includes second braking surface 52. In FIG. 3, foot pedal 33 is raised in relation to mounting bracket 20 which moves wheel 12 away from first braking surface 42 and second braking surface 52. When foot pedal 33 is lowered in relation to mounting bracket 20, as illustrated in FIG. 4, it transposes load bearing axis B substantially into intersection with axis of rotation R of wheel 12, placing wheel 12 in contact with first braking surface 42.

In one embodiment, sliding pin 37, extending through break lever 30, is slidably received in slots 57 defined in second braking member 50. When foot pedal 33 is lowered, it moves second braking member 50 such that second braking surface 52 contacts wheel 12.

In a further embodiment, when castor 10 is in a locked position, locking member 60 (described below) cooperates with second braking member 50 to selectively keep castor 10 from moving to an unlocked position. In one embodiment, the sidewalls of locking member 60 nest between the sidewalls of second brake member 50.

FIGS. 6A and 6B illustrate side and front views of mounting bracket 20. In one embodiment pivot points 22 are punched, drilled or otherwise cut in bracket 20, and are pivotally attached to brake lever 30 when the castor is assembled. Rivets, bolts, pins or other pivot connections can be used. Bracket 20 also includes holes for mounting pins 24 and 26. Opposing dimples or protrusions 28 which extend towards brake lever 30 may optionally be formed in bracket 20.

Figure 7C:
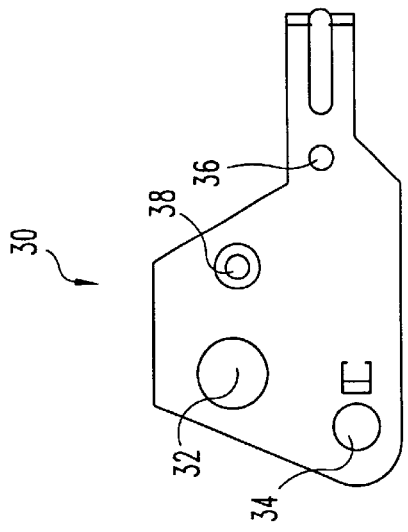
FIGS. 7A,7B, and 7C are flat, top-down, and side views of the brake lever used in the castor of FIG. 1.
Figure 7B:
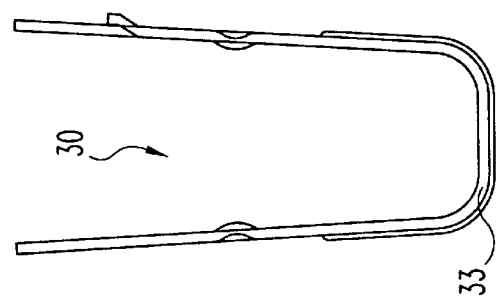
Figure 7A:
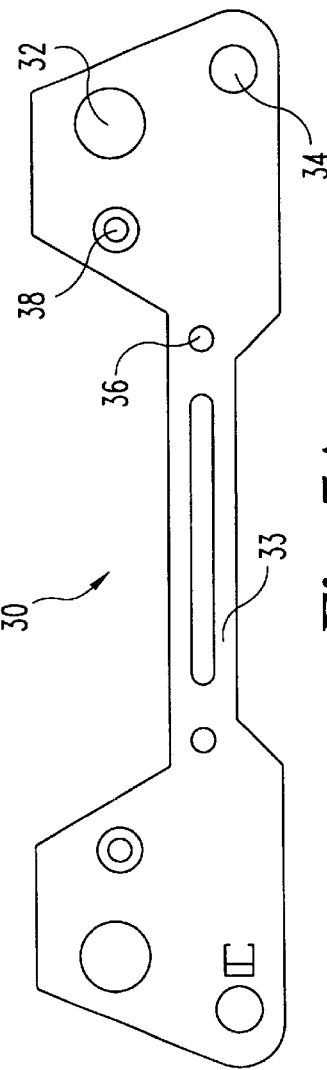

Brake lever 30 is illustrated in FIGS. 7A, 7B, and 7C. For illustration purposes a flat of brake lever 30 is illustrated in FIG. 7A, prior to being symmetrically bent to the tapered form shown in FIGS. 7B and 7C. Brake lever 30 includes foot pedal 33, axle or wheel pivot openings 34 for axle bolt 14, mounting or pivot points 32 for connection to mounting bracket 20, and optional stop openings 38. Stop points 38 and dimples 28 are located in an area of overlap between mounting bracket 20 and brake lever 30. Opposing stop points 38 may be punched or drilled through brake lever 30 or may be recessed dimples which cooperate to receive dimples 28 of mounting bracket 20 when castor 10 is in an unlocked position. Optional stop openings 38 and dimples 28 cooperate to yieldingly maintain caster 10 in an unlocked position until an operator purposefully switches caster 10 to a locked position.

Figure 8A:
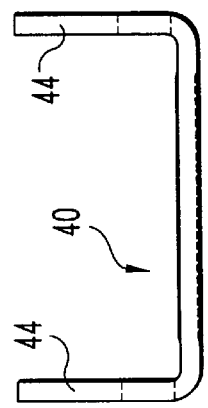
FIGS. 8A and 8B are front and flat, enlarged views of the first brake member and first brake surface used FIG. 1.
Figure 8B:
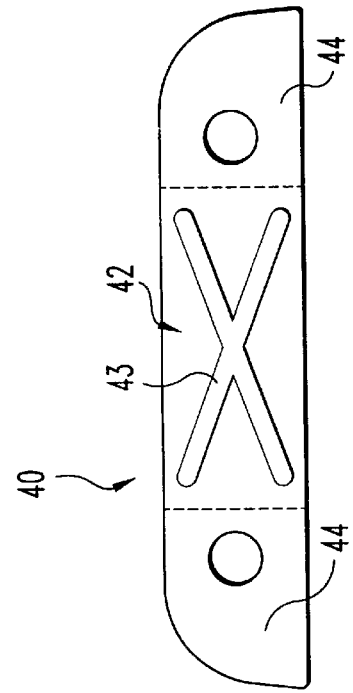

First braking member 40 is illustrated in front and flat views in FIGS. 8A and 8B. First braking member 40 includes first braking surface 42 and sidewalls 44. A braking pattern such as indented or raised portions 43 may be placed on first braking surface 42 and/or second braking surface 52. Example braking patterns may be an "X" as shown, circular or curved portions, and/or parallel or intersecting line segments.

Figure 9A:
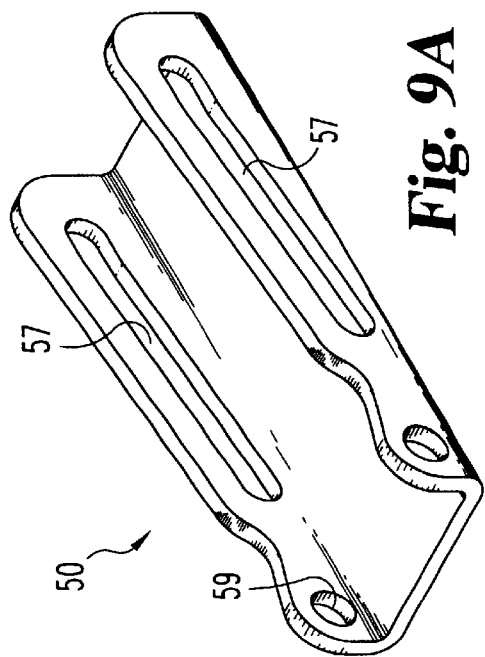
FIGS. 9A and 9B are perspective and side, enlarged views of a second brake member used in the castor of FIG. 1.
Figure 9B:
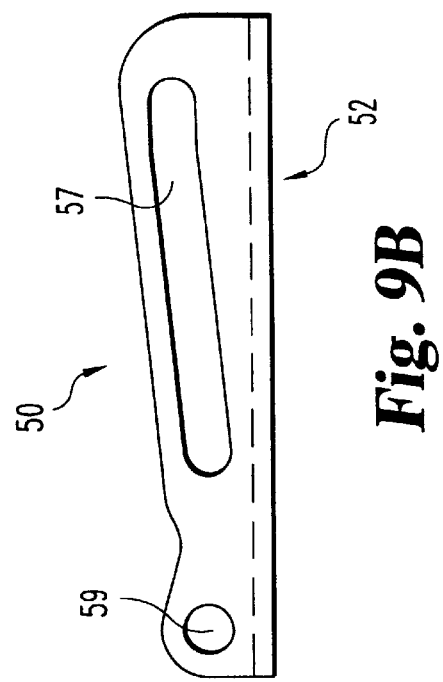

One embodiment of second braking member 50 is illustrated in FIGS. 9A and 9B. Second braking member 50 is formed with second braking surface 52, has one or more sliding slots 57 in the sidewalls, and has mounting holes 59 for mounting pin 24. As discussed above, a pattern may optionally be formed on second braking surface 52. In an alternate embodiment, second braking surface 52 formed with a concave surface to engage a larger surface area of wheel 12 when castor 10 is locked. Sliding pin 37 in brake lever 30 is received in slots 57 and travels within slots 57 when caster 10 is moved between a locked and an unlocked position. Sliding pin 37 alternatively is solidly attached or formed as a retaining portion of brake lever 30.

Figure 10A:
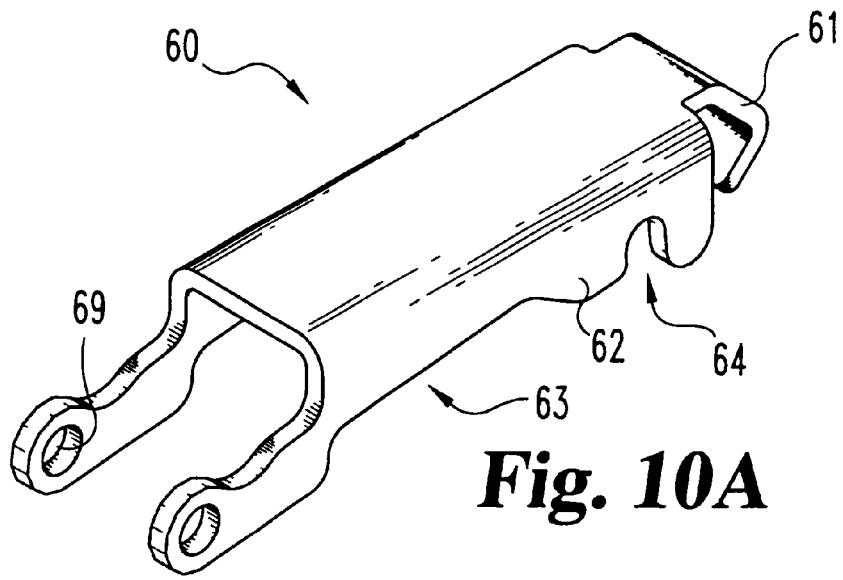
FIGS. 10A and 10B are perspective and side, enlarged views of a locking member used in the castor of FIG. 1.
Figure 10B:
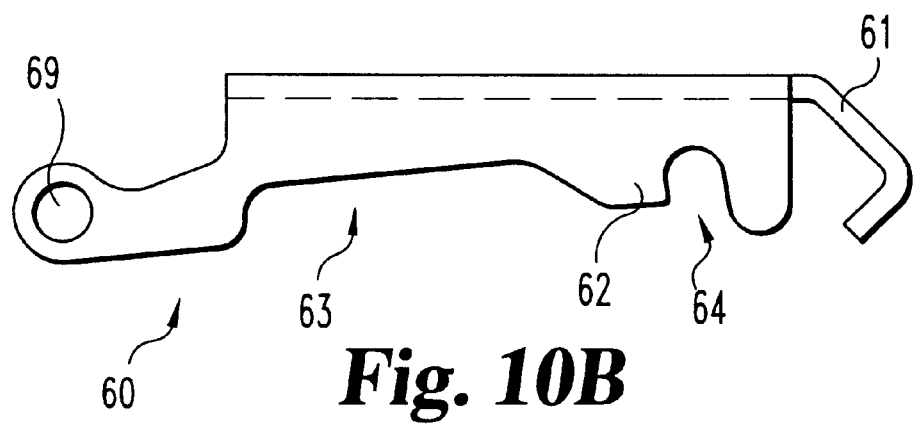

FIGS. 10A and 10B illustrate perspective and side views of locking member 60. Locking member 60 is mounted to mounting bracket 20 by mounting pin 24 which extends through mounting holes 69 in addition to mounting holes 59. When castor 10 is in an unlocked position, sliding tracks 63 rest atop sliding pin 37. When castor 10 is moved to a closed position, sliding pin 37 slides along sliding track 63, around tab 62 and is received into defined holding slots 64 transverse to sliding pin 37. Once engaged in holding slots 64, sliding pin 37 is held by tabs 62 from sliding back until locking member 60 is lifted by handle 61. Alternatively, locking member 60 may terminate in a tab or flange which abuts sliding pin 37 when engaged, or locking member 60 includes holding flanges or tabs 62 which abut sliding pin 37 to lock it in position without flanges or tabs on the opposite side of sliding pin 37.

In operation, one or more castors 10 are deployed for a load, such as scaffolding, during assembly. Prior to movement the castor is placed in an unlocked or wheel rotating position, allowing the wheel to rotate and/or the castor to pivot to allow the load to be rolled to a desired location. Once in place, the operator step pivot points 22 on foot pedal 33 of brake lever 30 shifting the load around the fulcrum of pivot points 22 and pivoting castor axis C so that load bearing axis B of mounting bracket 20 is transposed over wheel 12 and intersects or slightly passes rotational axis R. During each movement from a rotation to a locked position, or the reverse, load bearing axis B intersects axis of rotation R of wheel 12 once. When first brake member 40 contacts wheel 12, it prohibits further rotation of caster axis C.

Once shifted, wheel 12 is in contact with first braking surface 42 to substantially restrict wheel rotation. Concurrently, as brake lever 30 pivots caster axis C, brake lever 30 and sliding pin 37 apply a transverse force in slots 57 against brake member 50 bringing second brake surface 52 into contact with wheel 12 supplying additional resistance to wheel rotation.

In an alternate embodiment, brake lever 30 can be rotated so that load bearing axis B is transposed past axis of rotation R when locking castor 10. In this embodiment, load bearing axis B applies additional force to first brake member 40 by leverage, further restricting wheel movement and providing additional stability. The more load bearing axis B is moved past rotational axis R the more difficult it is to unlock caster 10 since load bearing axis B must be returned across axis of rotation R without the leverage benefit of brake lever 30.

In one embodiment, when the operator fully locks caster 10, holding slots 64 of locking member 60 receive sliding pin 37 and transverse tabs 62 abut sliding pin 37. Sliding pin 37 is thus held to prevent brake castor 10 from returning to an unlocked position until released. When unlocking is desired, handle 61 of locking member 60 is lifted, releasing sliding pin 37 from slot 64 and allowing sliding pin 37 to travel in slot 57 of second braking member 50, thus removing wheel 12 from contact with the braking surfaces.

For purposes of illustration, wheel 12 may be made from a durable rubber, or may be metal or stone as commonly understood in the industry. Similarly, brake lever 30, mounting bracket 20, first brake member 40, second brake member 50 and/or locking member 60 may be punched, stamped, cast, cut, molded, extruded or made using known methods from metal, plastic or other durable materials having sufficient strength. The pieces may be formed with appropriate openings and then bent or shaped into the desired forms using methods which are standard in the industry. Optionally, instructional indicia such as arrows, and/or the word "lock" may be engraved, stamped, or labeled on the components.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A castor, comprising:
   a wheel, wherein said wheel has an axis of rotation;
   a mounting bracket wherein said mounting bracket includes opposing pivot points and load means attachment with a load bearing axis;
   a brake lever rotatably mounted to said wheel adjacent said axis of rotation, and pivotally attached to said mounting bracket at said opposing pivot points, said brake lever being movable in relation to said wheel and said mounting bracket to selectively place said wheel in a locked position or a rotation position;
   a first brake surface associated with said mounting bracket such that when said wheel is in said locked position said first brake surface contacts said wheel and substantially restricts rotation of said wheel and,
   a second brake member extending between said mounting bracket and said brake lever and having a second brake surface, wherein said second brake surface contacts said wheel to restrict rotation when said wheel is in said locked position.

2. The castor of claim 1 wherein said load bearing axis intersects said axis of rotation once when said wheel is moved from said rotation position to said locked position.

3. The castor of claim 2 further comprising a lock operable with said second brake member, wherein said lock is selectively engagable to restrict said wheel from moving from said locked position to said rotation position.

4. The castor of claim 3 wherein said lock includes a locking member mounted to said mounting bracket in cooperation with said second brake member.

5. The castor of claim 4 and further comprising a sliding pin and wherein said brake lever has pin openings and said second brake member defining at least one slot such that said second brake member is coupled to said brake lever via said sliding pin which extends through said openings in said brake lever and said slot in said second brake member, and wherein said sliding pin slides within said slot when said brake lever is moved in relation to said mounting bracket.

6. The castor of claim 5 wherein said locking member defines at least one holding slot which receives said sliding pin when said wheel is in said locked position.

7. The castor of claim 6 wherein said brake lever includes a foot pedal portion to assist in moving said brake lever.

8. The castor of claim 7 wherein said brake lever has opposing sides with said wheel located between said sides wherein said sides are non-parallel and taper from said foot pedal.

9. The castor of claim 3 and further comprising a first brake member mounted to said mounting bracket, wherein said first brake surface is formed on said first brake member.

10. The castor of claim 9 wherein said first brake surface or said second brake surface include a braking pattern.

11. The castor of claim 9 further comprising opposing dimples extending from said mounting bracket towards said brake lever and wherein said mounting bracket and said brake lever define an area of overlap such that said dimples are located within said area of overlap and resist relative movement of said mounting bracket and said brake lever.

12. The castor of claim 11 wherein said brake lever defines opposing stop points which receive said dimples when said wheel is in said rotation position.

13. A castor, comprising:
    a wheel, wherein said wheel has an axis of rotation;
    a mounting bracket wherein said mounting bracket includes opposing pivot points and load attachment means with a load bearing axis;
    a brake lever having a proximal portion and a distal portion, wherein said proximal portion is rotatably mounted to said wheel adjacent said axis of rotation, and pivotally attached to said mounting bracket at said opposing pivot points, wherein said distal portion extends beyond said wheel and wherein said brake lever is movable in relation to said wheel and said mounting bracket to selectively place said wheel in a locked position or a rotation position;
    a first brake surface associated with said mounting bracket such that when said wheel is in said locked position said first brake surface contacts said wheel and substantially restricts rotation of said wheel;
    a member linking said mounting bracket to said distal portion of said brake lever; and,
    a lock associated with said member, wherein said lock is selectively engagable to restrict said wheel from moving from said locked position to said rotation position.

14. The castor of claim 13 wherein said member forms said lock such that said member is selectively engagable to restrict relative movement of said brake lever and said mounting bracket.

15. The castor of claim 14 further comprising a retaining portion associated with said brake lever and at least one holding tab defined on said member wherein said retaining portion cooperates with said at least one holding tab to restrict relative movement of said brake lever and said mounting bracket.

16. The caster of claim 15 further comprising a handle defined on said member to selectively disengage said holding tab from said retaining portion.

17. A castor, comprising:
    a wheel, wherein said wheel has an axis of rotation;
    a mounting bracket wherein said mounting bracket includes opposing pivot points and defines a load bearing axis;
    a brake lever having a proximal portion and a distal portion, wherein said proximal portion is rotatably mounted to said wheel adjacent said axis of rotation, and pivotally attached to said mounting bracket at said opposing pivot points, wherein said distal portion extends beyond said wheel, and wherein said brake lever is movable to selectively place said wheel in a locked position or a rotation position;
    a first brake surface associated with said mounting bracket such that when said wheel is in said locked position said first brake surface contacts said wheel and substantially restricts rotation of said wheel;
    a member linking said mounting bracket to said distal portion of said brake lever; and,
    restriction means associated with said member to restrict movement of said wheel from said locked position to said rotation position.

18. The castor of claim 17 wherein said restriction means includes a second braking surface associated with said member wherein said second braking surface contacts said wheel when said wheel is in said locked position.

19. The castor of claim 17 wherein said restriction means includes a lock associated with said member which selectively engages said brake lever in said locked position to prevent relative movement of said brake lever and said mounting bracket.

* * * * *